US011522869B2

(12) United States Patent
Peterson et al.

(10) Patent No.: US 11,522,869 B2
(45) Date of Patent: Dec. 6, 2022

(54) USER APPROVAL OF APPLICATION COMMUNICATION BASED ON LOCATION OR DOMAIN NAME FOR DEVICE

(71) Applicant: Lenovo (Singapore) Pte. Ltd., Singapore (SG)

(72) Inventors: Nathan J. Peterson, Oxford, NC (US); Russell Speight VanBlon, Raleigh, NC (US); John Carl Mese, Cary, NC (US); Arnold S. Weksler, Raleigh, NC (US); Mark Patrick Delaney, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 16/997,479

(22) Filed: Aug. 19, 2020

(65) Prior Publication Data
US 2022/0060480 A1  Feb. 24, 2022

(51) Int. Cl.
*H04L 9/40*   (2022.01)
*G06F 9/451*  (2018.01)
*H04L 67/52*  (2022.01)
*H04L 67/75*  (2022.01)
*G06F 3/16*   (2006.01)
*G06F 3/04842* (2022.01)

(52) U.S. Cl.
CPC ............ *H04L 63/107* (2013.01); *G06F 9/451* (2018.02); *H04L 67/52* (2022.05); *H04L 67/75* (2022.05); *G06F 3/04842* (2013.01); *G06F 3/167* (2013.01)

(58) Field of Classification Search
CPC ....... H04L 63/107; H04L 67/18; H04L 67/36; H04L 67/75; H04L 67/52; G06F 9/451; G06F 3/04842; G06F 3/167
See application file for complete search history.

(56) References Cited

U.S. PATENT DOCUMENTS

| 6,345,361 B1 * | 2/2002 | Jerger .................... G06F 21/62 713/323 |
| 8,887,245 B1 * | 11/2014 | Wiltzius .............. H04L 63/1433 726/4 |
| 9,172,705 B1 * | 10/2015 | Kong .................. G06F 21/6218 |
| 2004/0003290 A1 * | 1/2004 | Malcolm ............. H04L 63/0263 726/28 |
| 2005/0005165 A1 * | 1/2005 | Morgan ................ H04L 63/029 726/4 |

(Continued)

*Primary Examiner* — Tadesse Hailu
(74) *Attorney, Agent, or Firm* — John M. Rogitz; John L. Rogitz

(57) ABSTRACT

In one aspect, a first device includes at least one processor and storage accessible to the at least one processor. The storage includes instructions executable by the at least one processor to determine that an application stored at the first device is programmed to communicate with a second device. The instructions are then executable to, based on the determination, present an indication at the first device of a current location of the second device and/or a domain name associated with the second device. The instructions are also executable to receive user input approving the application to communicate with the second device subsequent to presenting the indication, and then to permit the application to communicate with the second device via the first device responsive to the user input.

19 Claims, 6 Drawing Sheets

(56) References Cited

U.S. PATENT DOCUMENTS

| | | | | |
|---|---|---|---|---|
| 2005/0097549 A1* | 5/2005 | Chu | ............ | H04L 67/52 |
| | | | | 717/173 |
| 2012/0185942 A1* | 7/2012 | Dixon | ............ | H04L 63/1483 |
| | | | | 726/24 |
| 2014/0109186 A1* | 4/2014 | Oikonomidis | ...... | G06F 21/6218 |
| | | | | 726/4 |
| 2014/0129457 A1* | 5/2014 | Peeler | ............ | G06Q 30/018 |
| | | | | 705/317 |
| 2014/0223516 A1* | 8/2014 | Vongsouvanh | ..... | H04L 63/0492 |
| | | | | 726/4 |
| 2015/0081440 A1* | 3/2015 | Blemaster | ............ | G06F 3/04817 |
| | | | | 705/14.54 |
| 2016/0055490 A1* | 2/2016 | Keren | ............ | G06F 16/951 |
| | | | | 705/14.47 |
| 2016/0092176 A1* | 3/2016 | Straub | ............ | G06F 8/38 |
| | | | | 717/107 |
| 2016/0092180 A1* | 3/2016 | Straub | ............ | G06T 1/0007 |
| | | | | 715/762 |
| 2016/0170814 A1* | 6/2016 | Li | ............ | G06F 9/542 |
| | | | | 719/318 |
| 2016/0364771 A1* | 12/2016 | Nielsen | ............ | G06F 16/9566 |
| 2017/0230378 A1* | 8/2017 | Bliss | ............ | H04W 4/80 |
| 2019/0020664 A1* | 1/2019 | Wood | ............ | H04L 63/145 |
| 2019/0213574 A1* | 7/2019 | Chittaro | ............ | G06Q 40/04 |
| 2019/0268357 A1* | 8/2019 | Rostamabadi | ...... | H04L 63/1425 |

\* cited by examiner

USER APPROVAL OF APPLICATION COMMUNICATION BASED ON LOCATION OR DOMAIN NAME FOR DEVICE

FIELD

The present application relates to technically inventive, non-routine solutions that are necessarily rooted in computer technology and that produce concrete technical improvements.

BACKGROUND

As recognized herein, more and more applications ("apps") downloaded from online places such as an app store contain various viruses, trojan horses, and other malware that can give some one else control over the user's device and/or personal data. Furthermore, in some cases an initial version of an app might be benign to get people to download and use it, ultimately inducing those people and others to download subsequent app updates or later versions of the same app that contain the malware. There are currently no adequate solutions to the foregoing computer-related, technological problem.

SUMMARY

Accordingly, in one aspect a first device includes at least one processor, a display accessible to the at least one processor, and storage accessible to the at least one processor. The storage includes instructions executable by the at least one processor to determine that an application is programmed to communicate with a second device via the first device. The instructions are also executable to, based on the determination, present a graphical user interface (GUI) on the display that includes an indication of a location of the second device. The GUI also includes a selector that is selectable to approve communication of the application with the second device via the first device. The instructions are then executable to receive user input selecting the selector and to permit the application to communicate with the second device via the first device responsive to selection of the selector.

In some examples the instructions may also be executable to disallow the application to communicate with the second device via the first device responsive to user input received at the first device to not permit the application to communicate with the second device via the first device. So, for example, the selector may be a first selector and the GUI may include a second selector that is selectable to provide the user input to not permit the application to communicate with the second device via the first device.

In some implementations, the indication of the location may include an internet protocol (IP) address. Additionally or alternatively, the indication of the location may include one or more of alphabetic characters indicating a country in which the second device is located and/or a map indicating a country in which the second device is located. Still further, the indication of the location may include text indicating a domain name associated with the second device.

Also in some implementations, the instructions may be executable to store, at the first device, data related to the user input selecting the selector. The instructions may then be executable to, responsive to the application subsequently attempting to communicate with the second device via the first device, permit the application to communicate with the second device via the first device based on the data and without additional input from the user.

Additionally, in some implementations the GUI may include a second selector that is selectable to permit the application to communicate, via the first device, with any other device located in a particular country. The second selector may be different from the first selector and the particular country may be a country in which the first device is currently located.

Still further, in certain examples the determination that the application is programmed to communicate with the second device may be based on the application attempting to communicate with the second device via the first device. Additionally or alternatively, the determination that the application is programmed to communicate with the second device may be based on data for the application that indicates the application is programmed to communicate with the second device.

Also in certain examples, the second device may be a server and the application may be an application other than an operating system.

In another aspect, a method includes determining that an application stored at a first device is programmed to communicate with a second device. The method also includes, based on the determining, presenting an indication via the first device of one or more of a current location of the second device and a domain name associated with the second device. The method further includes receiving user input approving the application to communicate with the second device based on one or more of the current location and the domain name, and then permitting the application to communicate with the second device via the first device responsive to the user input.

In various examples, the indication of the current location may specify city, county, state, country, and/or continent.

In some implementations, the indication may be presented on a display of the first device and the user input may be received based on selection of a selector presented on the display. Also in some implementations, the indication may be presented audibly via the first device and the user input may include voice input received via a microphone.

Still further, in some examples the determining that the application is programmed to communicate with the second device may be based on one or more of the application requesting to communicate with the second device via the first device and/or data for the application that indicates the application is programmed to communicate with the second device. The data may be stored at the first device.

In still another aspect, at least one computer readable storage medium (CRSM) that is not a transitory signal includes instructions executable by at least one processor to determine that an application stored at a first device is to communicate with a second device. The instructions are also executable to, based on the determination, present an indication at the first device of one or more of a current location of the second device and a domain name associated with the second device. The instructions are then executable to, subsequent to presentation of the indication, receive user input approving the application to communicate with the second device. Responsive to the user input, the instructions are executable to permit the application to communicate with the second device via the first device.

In some implementations, the instructions may be executable to present the indication at least in part by presenting a graphical user interface (GUI) on a display accessible to the first device. The GUI may include a graphical indication of the current location and/or the domain name. The GUI may also include a selector that is selectable by a user to provide the user input.

The details of present principles, both as to their structure and operation, can best be understood in reference to the accompanying drawings, in which like reference numerals refer to like parts, and in which:

DETAILED DESCRIPTION

Figure 1:
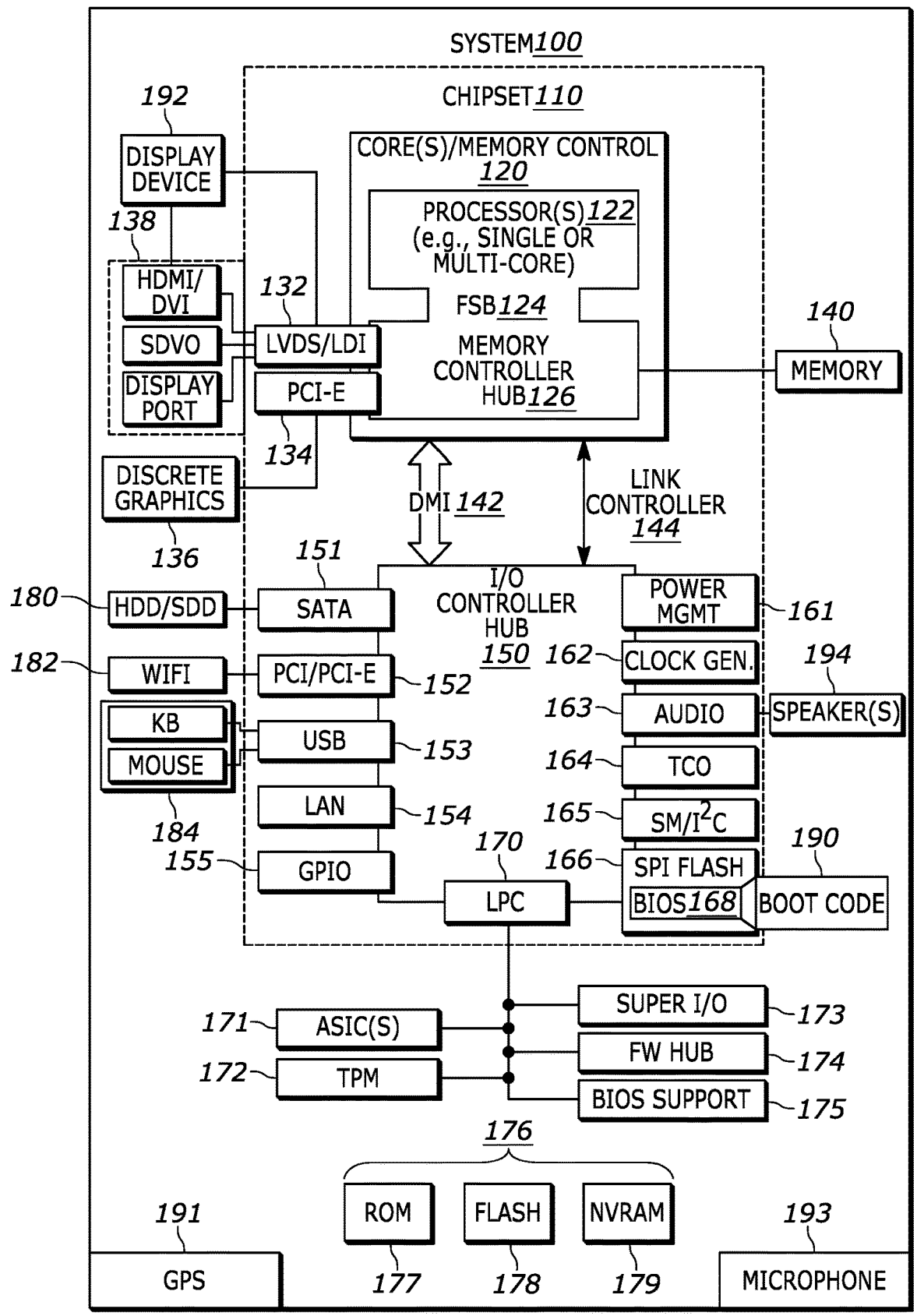
FIG. 1 is a block diagram of an example system consistent with present principles.

The present application provides systems and methods for a user's device to, if an app requests or needs network access, have the app communicate its destination networks to the user so that the user can approve or reject the destination networks. So, for example, apps may be required to register the domains or IP addresses they plan to communicate with. Thus, if the user gets an app update and if there are new domains or IP addresses included in the app's communication list as part of the update, this would be presented to the user so the user could accept or reject communication with those new domains or IP addresses.

These principles may be applied to authorize communication with specific servers, domains, and/or or geo-fenced areas. These principles may also be used to specify which country's devices a particular app is allowed to communicate with. For example, the user may allow all apps to dynamically communicate with the current country the user/user's device is in. If the user travels to another country, the user's device would allow the app to communicate with localized servers in that country as well.

Prior to delving further into the details of the instant techniques, note with respect to any computer systems discussed herein that a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple Inc. of Cupertino Calif., Google Inc. of Mountain View, Calif., or Microsoft Corp. of Redmond, Wash. A Unix® or similar such as Linux® operating system may be used. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware, or combinations thereof and include any type of programmed step undertaken by components of the system; hence, illustrative components, blocks, modules, circuits, and steps are sometimes set forth in terms of their functionality.

A processor may be any general purpose single- or multi-chip processor that can execute logic by means of various lines such as address lines, data lines, and control lines and registers and shift registers. Moreover, any logical blocks, modules, and circuits described herein can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can also be implemented by a controller or state machine or a combination of computing devices. Thus, the methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may also be embodied in a non-transitory device that is being vended and/or provided that is not a transitory, propagating signal and/or a signal per se (such as a hard disk drive, CD ROM or Flash drive). The software code instructions may also be downloaded over the Internet. Accordingly, it is to be understood that although a software application for undertaking present principles may be vended with a device such as the system 100 described below, such an application may also be downloaded from a server to a device over a network such as the Internet.

Software modules and/or applications described by way of flow charts and/or user interfaces herein can include various sub-routines, procedures, etc. Without limiting the disclosure, logic stated to be executed by a particular module can be redistributed to other software modules and/or combined together in a single module and/or made available in a shareable library.

Logic when implemented in software, can be written in an appropriate language such as but not limited to hypertext markup language (HTML)-5, Java®/JavaScript, C# or C++, and can be stored on or transmitted from a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "circuit" or "circuitry" may be used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown that is understood to have a housing for the components described below. Note that in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100. Also, the system 100 may be, e.g., a game console such as XBOX®, and/or the system 100 may include a mobile communication device such as a mobile telephone, notebook computer, and/or other portable computerized device.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled light emitting diode display or other video display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (x16) PCI-E port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, a Bluetooth network using Bluetooth 5.0 communication, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes BIOS 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 may provide for communication with various devices, networks, etc. For example, where used, the SATA interface 151 provides for reading, writing or reading and writing information on one or more drives 180 such as HDDs, SDDs or a combination thereof, but in any case the drives 180 are understood to be, e.g., tangible computer readable storage mediums that are not transitory, propagating signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

Still in reference to FIG. 1, note that the system 100 may also include a global positioning system (GPS) transceiver 191 that is configured to communicate with at least one satellite to receive/identify geographic position information and provide the geographic position information to the processor 122. However, it is to be understood that another suitable position receiver other than a GPS receiver may be used in accordance with present principles to determine the location of the system 100.

As also shown in FIG. 1, the system 100 may include an audio receiver/microphone 193 that provides input from the microphone to the processor 122 based on audio that is detected, such as via a user providing audible input to the microphone consistent with present principles.

Additionally, though not shown for simplicity, in some embodiments the system 100 may include a gyroscope that senses and/or measures the orientation of the system 100 and provides related input to the processor 122, as well as an accelerometer that senses acceleration and/or movement of the system 100 and provides related input to the processor 122. The system 100 may also include a camera that gathers one or more images and provides images and related input to the processor 122. The camera may be a thermal imaging camera, an infrared (IR) camera, a digital camera such as a webcam, a three-dimensional (3D) camera, and/or a camera otherwise integrated into the system 100 and controllable by the processor 122 to gather pictures/images and/or video.

It is to be understood that an example client device or other machine/computer may include fewer or more features than shown on the system 100 of FIG. 1. In any case, it is to be understood at least based on the foregoing that the system 100 is configured to undertake present principles.

Figure 2:
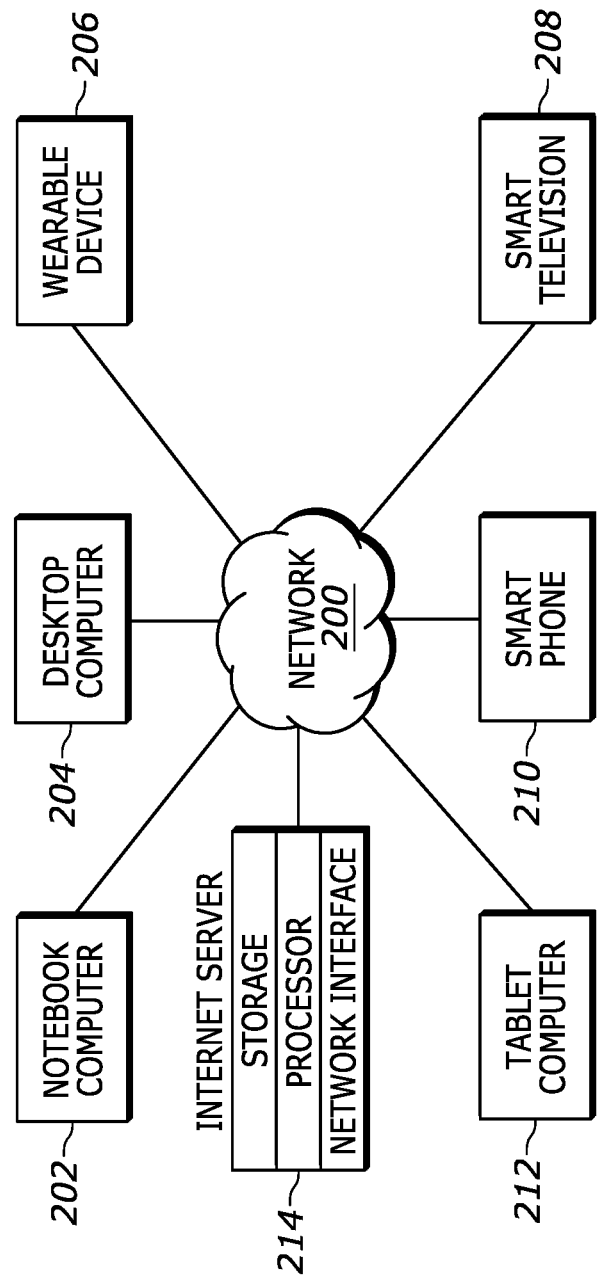
FIG. 2 is a block diagram of an example network of devices consistent with present principles.

Turning now to FIG. 2, example devices are shown communicating over a network 200 such as the Internet in accordance with present principles. It is to be understood that each of the devices described in reference to FIG. 2 may include at least some of the features, components, and/or elements of the system 100 described above. Indeed, any of the devices disclosed herein may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, and a server 214 such as an Internet server. It is to be understood that the devices 202-214 may be configured to communicate with each other over the network 200 to undertake present principles.

Figure 3:
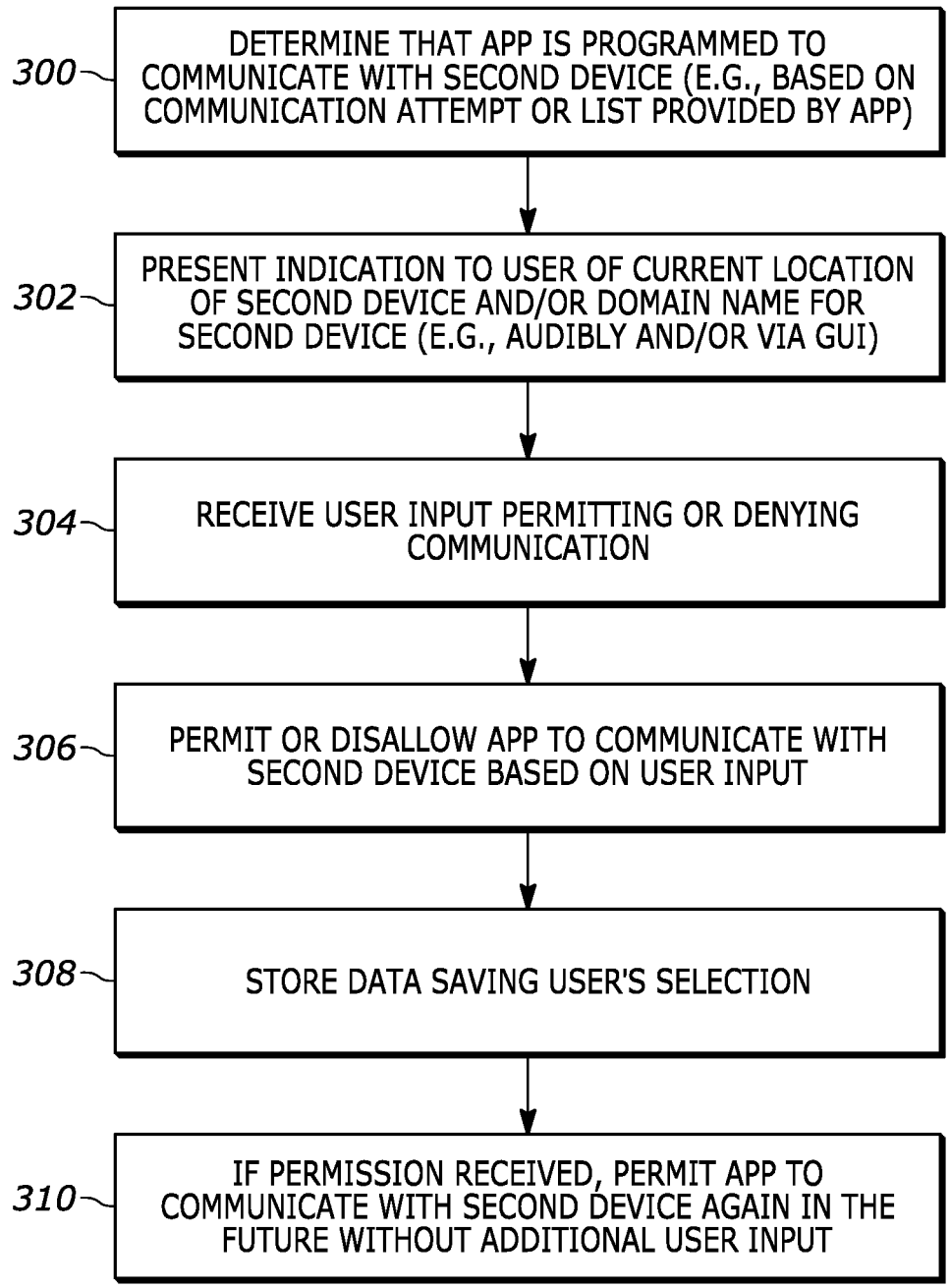
FIG. 3 is a flow chart of an example algorithm executable by a device consistent with present principles.

Referring now to FIG. 3, it shows example logic that may be executed by a first device such as the system 100 in accordance with present principles. Thus, the first device may be a smart phone, tablet computer, wearable device, laptop computer, etc.

Beginning at block 300, the first device may determine that an application downloaded and stored locally at the first device is programmed to communicate with a second device different from the first device. The second device may be, for example, a remotely-located server with which the application as downloaded or updated is preconfigured to communicate with. The application itself may be an application other than a guest or native operating system for the device, such as an email application, a social networking application, a news application, a music player application, a flashlight application, etc.

The determination made at block 300 may be made in various ways. For example, the user may launch the application itself or the application may otherwise begin executing at the first device, and then the first device may monitor outbound network traffic to determine that the application is attempting to communicate with the second device via the first device.

As another example, the first device may access data associated with the application to determine other devices with which the application is programmed to communicate. The data may be programming code for the application itself as stored at the first device that indicates the other devices. Additionally or alternatively, the data may be a list of internet protocol (IP) addresses and/or domain names for other devices with which the application is programmed to communicate, where the list may be stored at the first device as part of the application. In some examples, the list or other data may even be self-reported by the application itself to the first device's central processing unit (CPU), e.g., upon app download or upon updating the app.

From block 300 the logic may proceed to block 302. At block 302 the first device may present an indication to the user of the first device, where the indication may indicate a current location of the second device. Additionally or alternatively, the indication may indicate the domain name associated with the second device (e.g., as specified by the application as it attempts to access an address that includes the domain name). The domain name may be part of a public website address that the application executing at the first device is seeking to or is programmed to access, and in some specific examples the entire website address may be presented to the user.

The indication(s) themselves may be presented audibly and/or visually at block 302. For example, the first device may use a digital assistant to produce a computerized voice to read aloud the current location and/or domain name (via a speaker on the first device or in communication with the first device). Additionally or alternatively, the first device may present a graphical user interface (GUI) such as one of the GUIs of FIGS. 4 and 5 that will be described shortly.

But still in reference to block 302, note that the first device may determine the current location of the second device to present as part of the indication in a number of different ways. For example, the application may be currently executing at the first device and as part of its execution it might request to communicate with another device having a particular IP address. In this case, the first device may use an IP address location lookup website (e.g., WhatIsMyIPAddress.com) to enter the IP address specified by the application into the website's search field for the website to then return a location associated with the IP address. The returned location may be expressed in terms of town, city, county, state, country, and/or continent, etc. For the website itself to do so, the website may have access to one or more relational databases that correlate various IP addresses or IP address ranges to various locations.

As another example, rather than using the website search from the paragraph above, the first device itself may access a similar relational database in order to determine the location (e.g., in terms of city and country) that is associated with the IP address of the second device and hence the second device itself. This relational database may be publicly accessible over the Internet and/or may be stored locally at the first device, for example.

As another example, it is to be understood that the destination IP addresses themselves may indicate location via their respective network identification (ID) portions since the network IDs for IP addresses are assigned based on associated network location. Accordingly, in some examples the current location of the second device may be indicated by presenting the second device's IP address itself to the user.

Also before moving on to block 304, note in terms of block 302 that in some examples by presenting the domain name for a website associated with the second device that the application is seeking to access, the first device may in fact indicate the location of the second device since the location may be included in the domain name itself. For example, the domain name may include a country or city name in it, or may specify a certain company widely known to be based in a particular country.

From block 302 the logic may proceed to block 304. At block 304 the first device may receive user input permitting or denying the application to communicate with the second device via the first device. For example, the user input may be voice input provided through a microphone accessible to the first device and processed using a digital assistant and/or speech to text software in order to identify the user verbally granting or denying permission. The user input may also be received based on the user selecting a selector presented on a display accessible to the first device. Examples of such selectors will be described below in reference to FIGS. 4 and 5.

However, still in reference to FIG. 3, from block 304 the logic may next proceed to block 306. At block 306 the first device may, based on the user input, permit or disallow the application to communicate with the second device. To permit communication, for example, the first device may permit the application to use the first device's network transceiver(s) (e.g., Wi-Fi transceiver) to communicate with the second device. To deny communication (and possibly without additional user input beyond the input received at block 304), the first device may deny the application use of the first device's network transceiver, may close the application if it is currently launched or executing, may disable the application at the first device so it cannot even run in the background, and/or may uninstall the application from the first device.

After block 306, in some examples the logic may then proceed to block 308 where the first device may store data locally or in cloud storage that indicates or saves the user's selection to permit or deny the application from communicating with the second device. This data may then be used at block 310 to permit or deny the application to communicate with the requested device (and/or associated IP address or website address itself) again in the future without requesting further input from the user again to permit or deny. Thus, if permission is received at block 306, at block 310 each time the application launches and executes again in the future and the device seeks to access the same device via a certain IP address or domain name specified by the application, the user need not provide any additional user input to authorize such communication again and the first device may do so automatically based on the user's past authorization.

Figure 4:
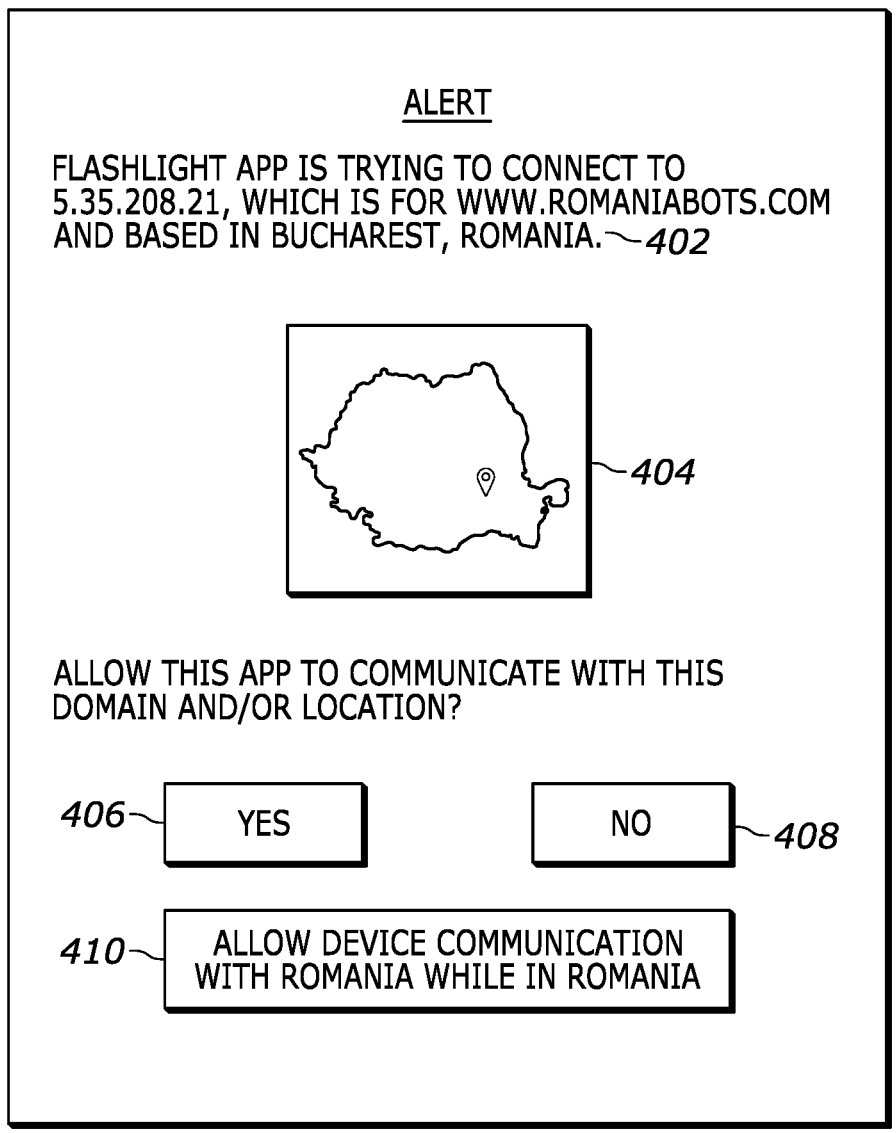
FIGS. 4 and 5 show example graphical user interfaces (GUIs) that may be presented to indicate domain name and location information for other devices a user's app would like to communicate with consistent with present principles, where the GUIs may also include selectors to approve or deny the communication.

Continuing the detailed description in reference to FIG. 4, it shows an example graphical user interface (GUI) 400 that may be presented on the display of the first device described above in reference to FIG. 3, such as at block 302. As shown, the GUI 400 may include a prompt 402 having text identifying an application by name ("Flashlight" in this case) that is attempting to communicate with another device having a particular IP address that is also specified in the prompt 402 as shown. As also shown, the prompt 402 may further specify a website address associated with the IP address as might be determined from a domain name system (DNS), where the domain name portion of the website address in this example indicates the country Romania in its name. Still further, the prompt 402 may specify a city and country in which the second device is determined to be located, which in this case is Bucharest, Romania. If desired, the prompt 402 may also include a map 404 of the country in which the second device has been determined to be located, and may even include a "dot" on the map 404 indicating the location of the city or town in which the second device is determined to be located.

As also shown in FIG. 4, the prompt 402 may ask the end-user of the first device whether the user would like to allow the Flashlight application to communicate with the indicated domain name and/or second device based on its location. Thus, the user may direct touch or cursor input to the selector 406 to permit the application to communicate with the second device based on the second device's domain name and/or location. In some examples, the selector 406 may even be selectable to permit any application stored at the first device to communicate with any other device with the same domain name and/or location (e.g., same country). However, note that the user may also select the selector 408 to disallow the application from communicating with the second device.

Additionally, assume for example that the first device is currently located in Romania while the GUI 400 is presented on its display. In some examples under these circumstances, based on the first device identifying that it is currently in Romania (e.g., via GPS coordinates reported by its GPS transceiver), the GUI 400 may include a selector 410. The selector 410 that may be selectable to set or enable the first device to always allow applications (e.g., additional applications and not just the Flashlight application) to communicate with other devices in Romania while the first device is itself located in Romania. This may be useful if the user were travelling through Romania and therefore his or her device would naturally attempt to access some other devices located in Romania while there. However, if the user were not located in Romania while an application executing at the first device were attempting to access a device located in Romania, this might be more suspect.

However, also note that in other examples the selector 410 may be selectable to set or configure the first device to always allow applications to communicate with other devices in a location that is more granular than country while the first device is at that location. For example, the selector 410 may be selectable to set or configure the first device to always allow applications to communicate with other devices in a certain city or state.

Figure 5:
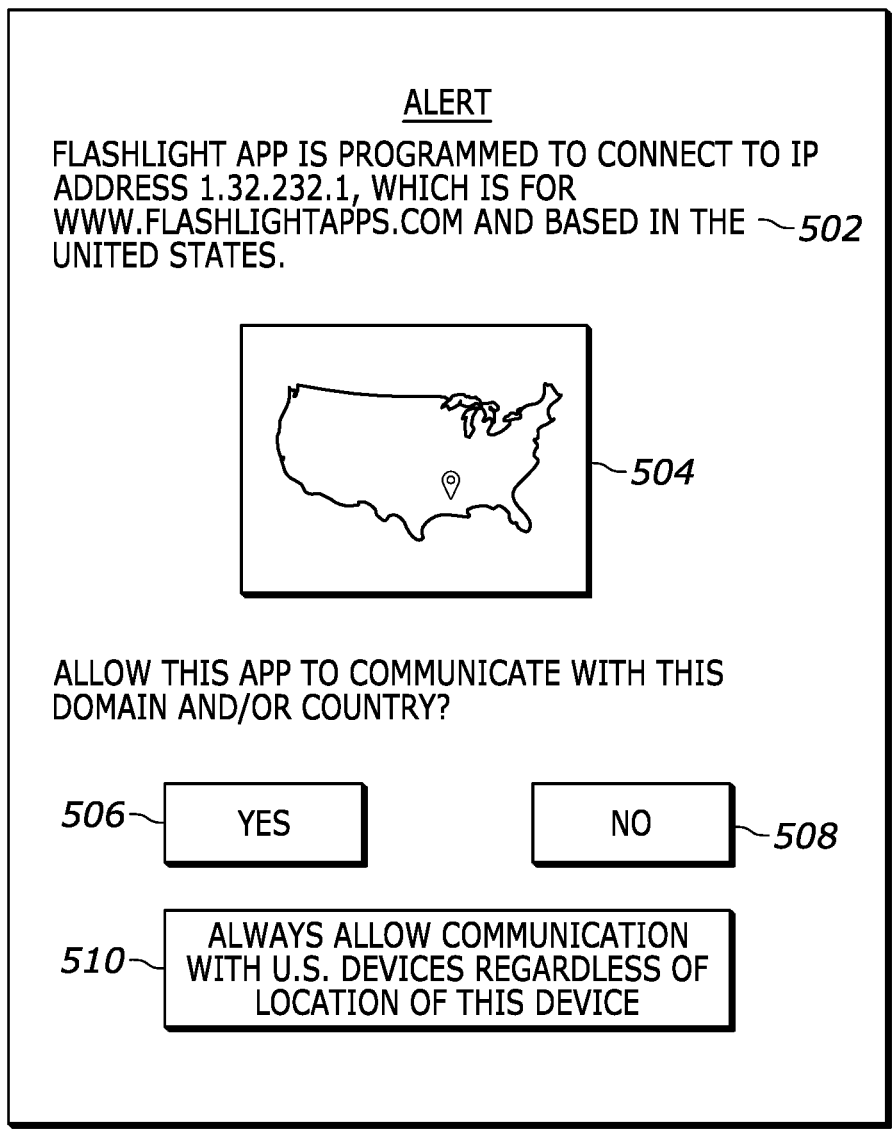

Now describing FIG. 5, another GUI 500 is shown that might also be presented on the first device's display at block 302 according to the description above. As shown, the GUI 500 may include a prompt 502 having text identifying an application by name ("Flashlight" again) that is attempting to communicate with another device having a particular IP address that is also specified in the prompt 502 as shown. As also shown, the prompt 502 may further specify a website address associated with the IP address as might be determined from a DNS, where the domain name portion of the website address in this example does not explicitly indicate any country in the name itself. However, the prompt 502 may still specify a country in which the second device is determined to be located, which in this case is the United States. If desired, the prompt 502 may also include a map 504 of the country in which the second device is determined to be located, and may even include a "dot" on the map 504 indicating the location of the city or town in which the second device is determined to be located. In this case, the "dot" is placed at the location of St. Louis as shown on the map 504.

As also shown in FIG. 5, the prompt 502 may ask the end-user of the first device whether the user would like to allow the Flashlight application to communicate with the indicated domain name and/or second device based on its location. Thus, the user may direct touch or cursor input to the selector 506 to permit the application to communicate with the second device based on the second device's domain name and/or location. In some examples, the selector 506 may even be selectable to permit any application stored at the first device to communicate with any other device with the same domain name and/or location (e.g., same country). However, note that the user may also select the selector 508 to disallow the application from communicating with the second device.

Additionally, assume for example that the first device is based in the United States and/or registered to a United States user, as might have been specified by the user during a device setup process. In some examples under these circumstances, based on the first device being based in and/or registered to the United States, the GUI 500 may include a selector 510. The selector 510 that may be selectable to set or enable the first device to always allow applications (e.g., additional applications and not just the Flashlight application) to communicate with other devices in the United States regardless of the current location of the first device, whether it too is in the United States or might be elsewhere if the user is traveling with it. This may be useful if the user were indeed travelling outside of the United States but still wanted to access applications the user typically accesses whose devices and/or services are still located in the United States. However, also note that in other examples the selector 510 may be selectable to set or configure the first device to always allow applications to communicate with other devices in a location that is more granular than country, such as to always allow communication with other devices in a particular city or state.

Figure 6:
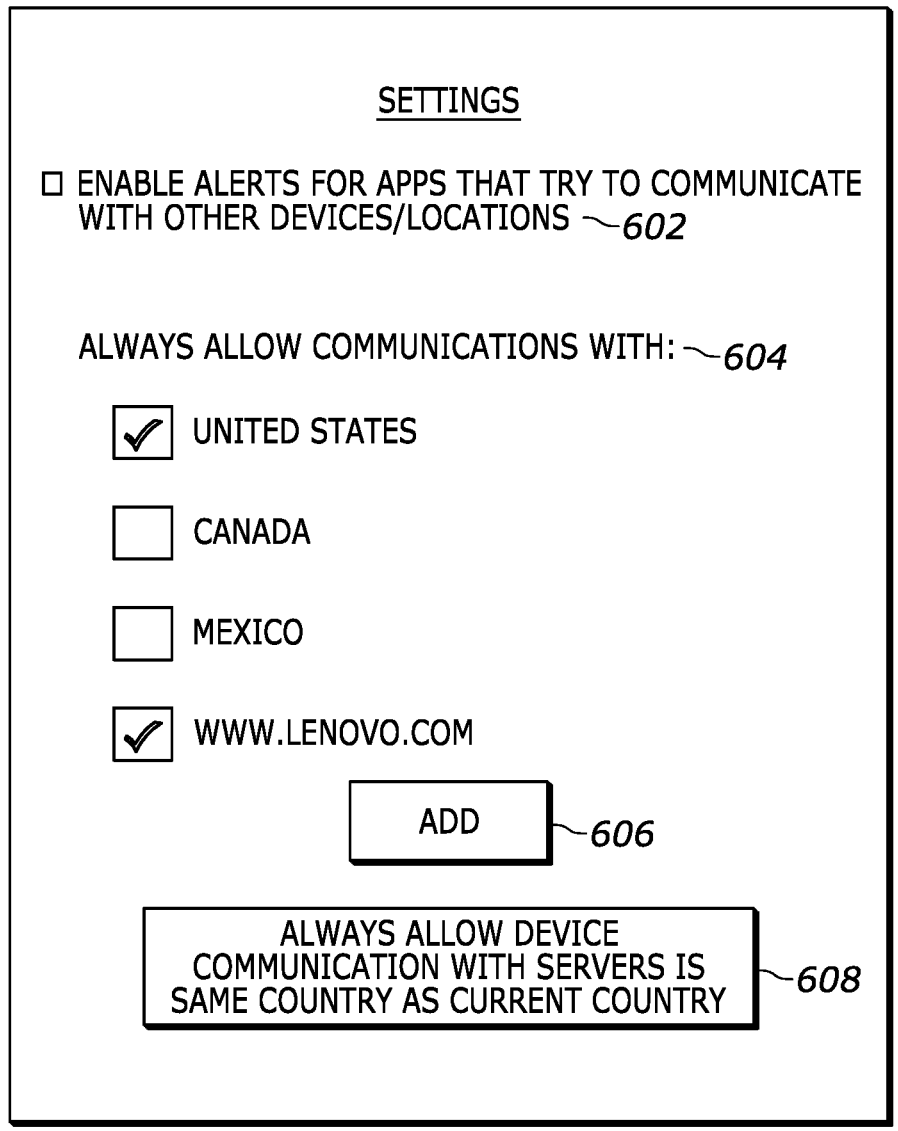
FIG. 6 is an example GUI that may be presented at the user's device for configuring one or more settings of the device to operate consistent with present principles.

Now describing FIG. 6, it shows an example GUI 600 that may be presented on the display of the first device described above in reference to FIG. 3 in order to configure one or more settings of the first device. For example, the GUI 600 may be navigated to through a settings menu of the first device.

As shown in FIG. 6, the GUI 600 may include an option 602 that is selectable by directing touch or cursor input to the adjacent check box in order to set or enable the first device to undertake present principles. For example, the option 602 may be selected to set or configure the first device to, in the future, undertake the logic of FIG. 3 and/or to execute the functions described in reference to FIGS. 4 and 5 for various different applications that are programmed to communicate with other remotely-located devices as disclosed herein.

As also shown, the GUI 600 may include a section 604 listing various locations and/or domain names for which the user has already provided permission for application communication from the first device (if the respectively adjacent check box is checked) and for which the user has denied permission for application communication (if the respectively adjacent check box is not checked). The user may then check or uncheck the respective box for each entry in the section 604 in order to change the permissions, if desired. Still further, in some examples the section 604 may include a selector 606 that may be selectable to add another location (e.g., country) or domain name for which application communication permission should always be granted or denied.

Still further, the GUI 600 may include a selector 608 that may be selectable to set or enable the device to, in the future and for multiple different applications, always allow the applications to communicate from the first device with other devices in the same country as the country in which the first device itself is currently located (or, more granularly, in the same city, state, etc.). This may be useful so that the user does not need to approve each different application to communicate with servers in various countries each time the user travels into one of those countries.

It may now be appreciated that present principles provide for an improved computer-based user interface that improves the functionality and security of the devices disclosed herein. The disclosed concepts are rooted in computer technology for computers to carry out their functions.

It is to be understood that whilst present principals have been described with reference to some example embodiments, these are not intended to be limiting, and that various alternative arrangements may be used to implement the subject matter claimed herein. Components included in one embodiment can be used in other embodiments in any appropriate combination. For example, any of the various components described herein and/or depicted in the Figures may be combined, interchanged or excluded from other embodiments.

What is claimed is:

1. A first device, comprising:
at least one processor;
a display accessible to the at least one processor; and
storage accessible to the at least one processor and comprising instructions executable by the at least one processor to:
present a settings graphical user interface (GUI) on the display, the settings GUI comprising a list of selectors, the selectors in the list being associated with different respective countries, the selectors in the list each being selectable from the settings GUI to approve one or more applications stored at the first device to communicate, via the first device, with other devices that are located in the respective country associated with the respective selector selected from the list;
receive user input selecting a first selector from the list; and
responsive to selection of the first selector, permit the one or more applications to communicate, via the first device, with other devices in the respective country associated with the first selector.

2. The first device of claim 1, wherein the settings GUI also comprises a second selector that is selectable to add another country for which application communication via the first device is approved.

3. The first device of claim 1, wherein the settings GUI is a first GUI, and wherein the instructions are executable to:
present, on the display, a second GUI different from the first GUI, the second GUI comprising an indication of a first country in which the first device is currently located, the second GUI comprising a second selector that is selectable to permit communication of one or more applications via the first device with any other device in the first country.

4. The first device of claim 1, wherein the user input is first user input, and wherein the instructions are executable to:
receive second user input selecting a second selector presented on the display;
responsive to receipt of the second user input, both deny a first application from communicating with other devices in a first country and uninstall the first application from the first device.

5. The first device of claim 4, wherein the second selector is presented as part of a second GUI different from the settings GUI.

6. The first device of claim 1, wherein the user input is first user input, and wherein the instructions are executable to:
receive second user input selecting a second selector presented on the display;
responsive to receipt of the second user input, both deny a first application from communicating with other devices in a first country and disable the first application at the first device.

7. A method, comprising:
presenting a graphical user interface (GUI) on a display, the GUI comprising plural selectors, each of the plural selectors being associated with a different respective domain name, each of the plural selectors being selectable to approve one or more applications stored at a first device to communicate, via the first device, with other devices that are associated with the respective domain name associated with the respective selector selected from the GUI;
receiving user input selecting a first selector from amongst the plural selectors; and
responsive to selection of the first selector, permitting the one or more applications to communicate, via the first device, with other devices that are associated with the respective domain name associated with the first selector.

8. The method of claim 7, wherein the domain names are website domain names.

9. The method of claim 7, wherein the GUI also comprises a second selector that is selectable to add another domain name for which application communication via the first device is approved.

10. The method of claim 7, wherein the GUI also comprises a second selector that is associated with a particular country, the second selector being selectable from the GUI to approve one or more applications stored at the first device to communicate, via the first device, with other devices that are located in the particular country.

11. The method of claim 10, wherein the GUI also comprises a third selector that is selectable to add another country for which application communication via the first device is approved.

12. The method of claim 7, wherein the GUI is a first GUI, and wherein the method comprises:
presenting, on the display, a second GUI different from the first GUI, the second GUI comprising an indication of a first domain name associated with a second device with which the first device is attempting to communicate, the second GUI comprising a second selector that is selectable to permit communication of one or more applications via the first device with any device associated with the first domain name.

13. The method of claim 7, wherein the user input is first user input, and wherein the method comprises:
receiving second user input selecting a second selector presented on the display;
responsive to receipt of the second user input, both denying a first application from communicating with other devices associated with first domain name and uninstalling the first application from the first device.

14. The method of claim 13, wherein the GUI is a first GUI, and wherein the second selector is presented as part of a second GUI different from the first GUI.

15. The method of claim 7, wherein the user input is first user input, and wherein the method comprises:
receiving second user input selecting a second selector presented on the display;
responsive to receipt of the second user input, both denying a first application from communicating with other devices associated with first domain name and closing the first application at the first device.

16. At least one computer readable storage medium (CRSM) that is not a transitory signal, the computer readable storage medium comprising instructions executable by at least one processor to:
present a graphical user interface (GUI) on a display, the GUI comprising plural selectors, the plural selectors each being associated with different respective countries, the plural selectors each being selectable from the GUI to approve one or more applications stored at a first device to communicate, via the first device, with other devices that are located in the respective country associated with the respective selector selected from the GUI;
receive user input selecting a first selector from the GUI, the first selector associated with a first country; and
responsive to selection of the first selector, permit the one or more applications to communicate, via the first device, with other devices in the first country;
wherein the user input is first user input, and wherein the instructions are executable to:
receive second user input selecting a second selector presented on the display;
responsive to receipt of the second user input, both deny a first application from communicating with other devices in a first country and uninstall the first application from the first device.

17. The CRSM of claim 16, wherein the GUI also comprises a third selector that is selectable to add another country for which application communication via the first device is approved.

18. The CRSM of claim 16, wherein the GUI also comprises a third selector that is associated with a particular domain name, the second selector being selectable from the GUI to approve one or more applications stored at the first device to communicate, via the first device, with other devices that are associated with the particular domain name.

19. The CRSM of claim 16, wherein the GUI is a first GUI, and wherein the instructions are executable to:
present, on the display, a second GUI different from the first GUI, the second GUI comprising an indication of a first country in which the first device is currently located, the second GUI comprising the second selector and a third selector, the third selector being selectable to permit communication of one or more applications via the first device with any other device in the first country.

* * * * *